ized solution of chloride of sodium in
UNITED STATES PATENT OFFICE.

THEODORE W. HEINEMANN, OF LOS ANGELES, CALIFORNIA.

PLASTER.

SPECIFICATION forming part of Letters Patent No. 554,183, dated February 4, 1896.

Application filed December 3, 1894. Serial No. 530,713. (No specimens.)

*To all whom it may concern:*

Be it known that I, THEODORE W. HEINEMANN, of the city and county of Los Angeles, State of California, have invented an Improvement in Medicinal and Surgical Dressing-Plasters; and the following is a description of the same.

My improvement refers to that class of plasters which adhere by the natural heat of the body and contain a considerable proportion of rubber. Plasters of this kind have a tendency to stick tenaciously to many things they come in contact with. They are therefore commonly faced with face-cloth.

It is the main purpose of my improvement to overcome the many objections to cloth-faced plasters and to save the expense of cloth-facing. To accomplish this I make a saturated solution of chloride of sodium in water. Through this I pass the plaster either once or several times after it has left the calender. As soon as the water is evaporated a deposit of a fine almost imperceptibly thin layer of very minute scales or crystals of chloride of sodium adheres to the face of the plaster and neutralizes its adhesiveness, so that it can be handled without face-cloths. When the plaster thus prepared is wanted for use it is only necessary to wipe or rinse the surface with water or immerse it for a few seconds to remove the chloride of sodium and restore the original adhesiveness. This process of preparing the plaster economizes space and machinery, reduces and expedites the manufacturing operations and saves the labor and material otherwise expended in cloth-facing. Plasters prepared by this process can better bear heat, pressure, humidity, and changes of climate. They are also less bulky, more convenient to use, handle, box, and pack.

Various modifications of this process may be adopted under conditions which make them desirable For instance, sulfate of soda, sulfate of magnesia or sugar, or any other harmless solid substance, quickly and freely soluble in water, may be substituted for chloride of sodium.

Powders quickly and freely soluble in water may be deposited and made to adhere on the face of the plasters, or instead of passing the plaster through the solution the solution may be applied to the face of the plaster. Unsaturated solutions may be applied. Sugar solution, followed by solution of chloride of sodium, I prefer.

Having fully explained my invention, I claim—

1. As an article of commerce and manufacture a rubber-base plaster, thinly covered on its adhesive side with a non-poisonous substance copiously and rapidly soluble in water, substantially as described and for the purposes mentioned.

2. As an article of commerce and manufacture a rubber-base plaster thinly covered on its adhesive side with a non-poisonous salt, substantially as described and for the purposes mentioned.

3. As an article of manufacture a rubber-base plaster, too adhesive for easy manipulation, having on its adhesive side, a layer or temporary covering of chloride of sodium, substantially as described and for the purposes mentioned.

THEODORE W. HEINEMANN.

Witnesses:
WILLIAM M. BOWEN,
CALVIN C. BOWEN.